(12) United States Patent  
Tschanz

(10) Patent No.: US 8,447,756 B2  
(45) Date of Patent: May 21, 2013

(54) INFORMATION-RETRIEVAL DEVICE BASED ON A COLLECTION OF FOLDED SHEETS AND CORRESPONDING METHOD

(76) Inventor: Pierre-Yves Tschanz, Senarclens (CH)

( * ) Notice: Subject to any disclaimer, the term of this patent is extended or adjusted under 35 U.S.C. 154(b) by 75 days.

(21) Appl. No.: 12/963,781

(22) Filed: Dec. 9, 2010

(65) Prior Publication Data

US 2011/0078221 A1    Mar. 31, 2011

Related U.S. Application Data

(63) Continuation of application No. PCT/EP2009/057445, filed on Jun. 16, 2009.

(30) Foreign Application Priority Data

Jun. 16, 2008    (CH) ...................................... 0912/08

(51) Int. Cl.  
*G06F 17/30* (2006.01)

(52) U.S. Cl.  
USPC .......................................... 707/716; 707/829

(58) Field of Classification Search ........................ None  
See application file for complete search history.

(56) References Cited

U.S. PATENT DOCUMENTS

2003/0061227 A1    3/2003  Baskins et al.  
2006/0112108 A1*   5/2006  Eklund et al. .................. 707/100

OTHER PUBLICATIONS

Fayyad, U. et al.: "Information Visualization in Data Mining and Knowledge Discovery" 2002, Morgan Kaufmann Publishers, 6890 155860, XP002502459, Figs 17.1-17.3, section "17.2 Integrating Different Mining Algorithms".  
International Search Report for PCT/EP2009/057445, dated Aug. 28, 2009.

* cited by examiner

*Primary Examiner* — Belinda Xue  
(74) *Attorney, Agent, or Firm* — Pearne & Gordon LLP

(57) ABSTRACT

The information retrieval devices of the present invention are composed of two dual hierarchical structures, the first structure containing the premises and the second the consequences/prescriptions arising from the premises. According to a variant embodiment, the information is represented by a collection of nested folded sheets not bound to one another. Advantage: reduction of the space or of the paper required for storing the information and reduction of the processing time.

7 Claims, 3 Drawing Sheets

| A | | | | | | | |
|---|---|---|---|---|---|---|---|
| A1 | | | | A2 | | | |
| A11 | | A12 | | A21 | | A22 | |
| A111 | A112 | A121 | A122 | A211 | A212 | A221 | A222 |

300

| B111 | B112 | B121 | B122 | B211 | B212 | B221 | B222 |
|---|---|---|---|---|---|---|---|
| B11 | | B12 | | B21 | | B22 | |
| B1 | | | | B2 | | | |
| B | | | | | | | |

| | A | B | C | D | E |
|---|---|---|---|---|---|
| COVER FOLDER | | | | | non-E |
| | | | | non-D | non-D.1 |
| | | | | | non-D.1 |
| | | | non-C | non-C.1 | non-C.1.1 |
| | | | | | non-C.1.2 |
| | | | | non-C.2 | non-C.2.1 |
| | | | | | non-C.2.2 |
| | | non-B | non-B.1 | non-B.1.1 | non-B.1.1.1 |
| | | | | | non-B.1.1.2 |
| | | | | non-B.1.2 | etc. |
| | | | non-B.2 | non-B.2.1 | |
| | | | | non-B.2.2 | |
| | non-A | non-A.1 | non-A.1.1 | non-A.1.1.1 | |
| | | | | non-A.1.1.2 | |
| | | | non-A.1.2 | non-A.1.2.1 | |
| | | | | non-A.1.2.2 | |
| | | non-A.2 | non-A.2.1 | | |

INFORMATION-RETRIEVAL DEVICE BASED ON A COLLECTION OF FOLDED SHEETS AND CORRESPONDING METHOD

REFERENCE DATA

The present application is a continuation of international PCT application PCT/EP2009/057445 (WO2009153253) filed on Jun. 16, 2009, the contents of which are hereby incorporated, and which claims priority from Swiss patent application 2008CH-00912 of Jun. 16, 2008, the contents whereof are hereby incorporated.

TECHNICAL FIELD

The present invention concerns an information-retrieval device allowing in a simple and interactive way the creation, the dynamic updating, the storage and the use of knowledge bases, notably of knowledge bases organized according to a hierarchical model. This invention concerns in particular an information-retrieval device relying on a nested arrangement of folded leafs or sheets.

STATE OF THE ART

Bookbinding is an ancient technique that allows collecting printed information in a compact book, comprising a plurality of pages sewn, glued, or otherwise bound together on the spine. Bound book may be one of the oldest and most widely spread support of information and are particularly appreciated when a solid and compact document is needed, and can be economically mass-produced. Books and bound documents, however, are best employed for documents with a simple linear structure, and can hardly be modified once bound.

Several devices for filing or temporary binding loose documents together are also known in the art. Such binders are used in offices, for example, and allow to store information presented in a collection of loose leafs or sheets in a compact and solid manner. File binders allow information update by sorting, suppressing and inserting new information in the form of new or amended leafs or sheets. These devices however, as bound books, are best suited for information that can be read according to a linear progressive order, and do not offer a natural way to store a complex knowledge base in a manner reflecting his logical structure.

Also classification systems based on loose cards are known, that allow retrieval of information in an indexed catalogue, according to one or more indexes. These systems are however less appropriate to store and retrieve information that is not indexed, but organized according to a complex hierarchical structure.

Many technical and economic fields require the accumulation of a large mass of information and knowledge and their application in decision processes. One can notably mention: the legal field, including the drafting of contracts; the diagnostic process in the medical field; the drafting of technical or instructional handbooks; etc. Often the underlying structure of the knowledge base is rule-driven.

In several domains, knowledge bases are known that are specially organized for the management, organization and searching of knowledge. One uses either knowledge bases that can be directly exploited by a computer, possibly provided with an artificial intelligence program, or knowledge bases printed or displayed on a screen, designed to be read and used by human users.

It is notably known to represent knowledge bases by tree structures, for example the structure illustrated in FIG. 1. A tree is defined by a set of nodes, or cells, connected to one another by branches, or links. The hierarchical position of a node is determined by the number of branches separating this node from a common trunk from which all branches derive directly or indirectly. In these structures, the knowledge or information of a general nature is placed towards the tree trunk whilst the elements representing increasingly specific situations are placed in the lower hierarchical order nodes (the twigs).

In this tree structure, each cell corresponds to a decision node, i.e. a question whose answer determines the next branch that is to be followed. The node itself does not bear any information but serves only for orientation purposes in the tree. The useful information is generally found in the last cells of the lower hierarchical order; it is thus necessary to browse the whole tree before arriving at the desired cell that contains the sought answer. In the case of a complex hierarchical structure, the path to be traveled through the tree is considerable and requires considerable memory and time resources before the desired information can be found.

Furthermore, this representation as a tree requires considerable space, both in the memory of a computer system as well as on a sheet or a screen for displaying this tree. Indeed, the tree comprises not only nodes corresponding to the different situations to be analyzed, but also branches corresponding to the hierarchical relations between these nodes. In the example of FIG. 1, it can be seen that a considerable proportion of the width and height of the tree diagram is occupied by branches that yet convey only limited information. Storing this tree in a computer system thus requires considerable memory only for storing the definition of all the branches, for example a starting point and a stopping point of each branch. Updating such a tree is difficult; modifying or deleting a single branch has consequences on many other branches of different hierarchical levels.

Another disadvantage of most of the frequently used knowledge bases is their rigid and immutable structure. In the case of a hierarchical structure printed in the form of a tree or a table, for example, an adjunction or a correction usually implies that all the elements must be rearranged and reprinted; in any case, it is necessary to frequently modify the definition of the different branches.

Knowledge bases are further known that are displayed on a screen by a computer program. Decision or diagnostic systems for example are known in which a series of questions, whose answers determine a path in a knowledge base, is proposed to the user. These systems are more flexible. The representation in the form of a decision tree, however, suffers from the same problems as in the case of a system on paper, notably considerable memory and screen space for storing the decisional branches, considerable time for traveling the tree from the trunk to the last cells containing the useful information, difficulty to generate quick and efficient edition routines, etc.

BRIEF SUMMARY OF THE INVENTION

One aim of the present invention is to propose methods for generating hierarchical structures free from the limitations of the known methods.

Another aim is to propose a data compression method allowing the memory space (or the paper surface) necessary for storing an arborescence to be reduced in order to reduce the electronic memory requirements, to increase the processing speed, and to allow a denser impression on paper supports or on screens of reduced dimensions.

Another aim of the invention is to propose documents and representations of hierarchical knowledge bases that can be more easily consulted and modified.

According to the invention, these aims are achieved by the method and the objects of the independent claims.

As will be seen, the invention makes it possible to store a hierarchical tree in compressed form, by storing the hierarchical structure in an implicit manner, for example by using the information on the position occupied by the cell in a spreadsheet or the position of a leaf in a set of leafs inserted into one another. It is thus possible to avoid storing explicit branches or links between the cells or the nodes.

BRIEF DESCRIPTION OF THE FIGURES

Examples of embodiments of the invention are indicated in the description illustrated by the attached figures, in which.

EXAMPLE(S) OF EMBODIMENTS OF THE INVENTION

Figure 2:
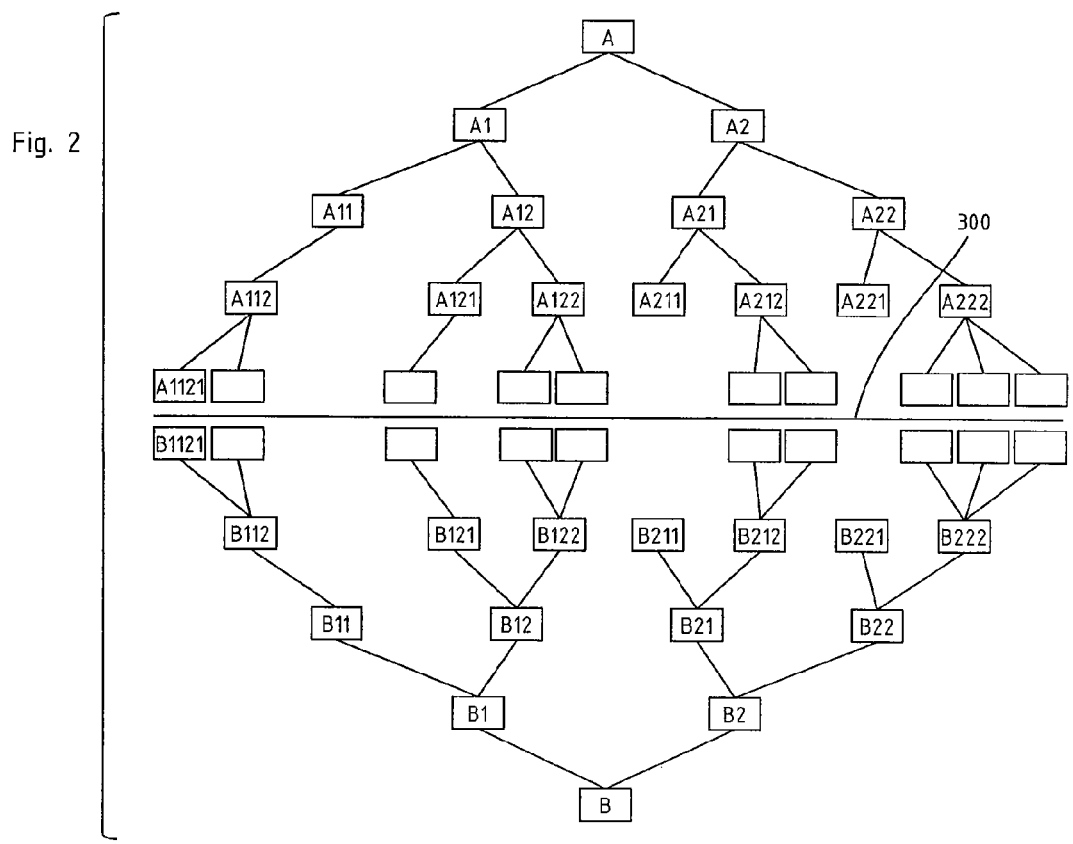
FIG. 2 illustrates a representation of a hierarchical knowledge structure in the form of a double tree.

FIG. 2 illustrates a knowledge base represented in the form of a double symmetrical tree. The median line 300 separates the two trees A and B.

The generation of the structure of FIG. 2 comprises a step of determining the premises, and consequences or prescriptions. By premise, for example, one understands a proposition that can be true or false, and by consequence, the necessary, logical or legal result of a premise.

The knowledge bases of the present application can be used in any rule-driven system, particular, though not exclusively, in the legal field. In this case, the premises designate for example legally significant facts, and the prescriptions designate rights, obligations, powers, options or conditions deriving from these premises.

One example of a premise in the legal field could be for example:

(A) Offer to entrust a mandate to a third party

The corresponding consequence is then for example:

(B) The third party has the right to accept the mandate.

The following premises arise from this consequence.

(A1) The third party accepts the mandate

Or (A2) The third party does not accept the mandate etc.

In the upper tree of FIG. 2, the premises are organized hierarchically, whilst the consequences of these premises, which are also prescriptions, are displayed or represented in the lower tree. Expressed differently, the lower tree thus contains the generating data (driving data) whilst the upper tree contains the generated data (driven data).

It is important to note that the consequences and the premises are linked in corresponding pairs by a relation, for example a causality link, logical or legal, and that the two elements of a corresponding pair occupy the same hierarchical position in the upper and lower trees. Graphically, this relation translates into symmetry relative to the horizontal line 300 of FIG. 2: the premise A corresponds to the consequence in the symmetrical position B; the premise A1 to the consequence B1, and so on.

Each premise (for example A1) has, bar exceptions, a single consequence (B1). On the other hand, each consequence constitutes a prescription followed by at least two alternative premises. For example, apart from the two premises (A1) and (A2) arising from the prescription (B) in the example above, a third premise could be added as follows:

(A3) The third party accepts with conditions

By moving from a prescription towards a new level of premises, or driven data, the higher number of premises proposed as alternatives (typically two) implies that a choice must be performed among these different premises before progressing towards the next prescription.

The choice between several premises proposed as alternatives can be individualized by adding information that particularize the corresponding prescription, by making it more specific and corresponding to different situations in order to facilitate the choice of a particular premise from a prescription. Individualization typically comprises a series of distinctions and sub-distinctions leading to increasingly concrete hypotheses for which the prescription can be worded ever more concretely.

In the example here above, a prescription "the arbitrator must be independent of the parties" is individualized in the hypothesis of an arbitrator having a business relationship with the counsel of one party if the arbitrator does not draw from this relationship a substantial part of his income. Once the prescription has been individualized in this way, its realization in the specific case is easy to verify: does the arbitrator draw a substantial part of his income from said business relationship?

Figure 1:
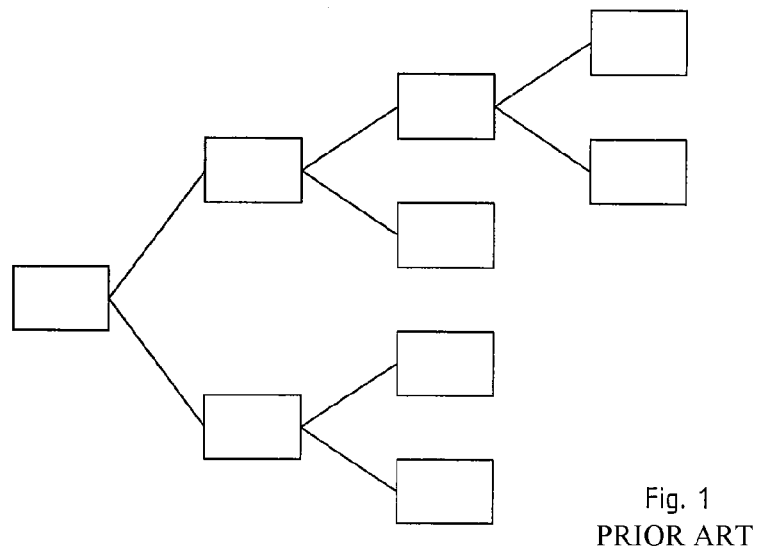
FIG. 1 illustrates generically a tree structure.

The representation of FIG. 2 is advantageous relative to the conventional tree representation according to FIG. 1, since it allows the premises to be clearly separated from the consequences of these premises, which include the next prescriptions. It is thus not necessary to travel through the entire tree before knowing the consequences of previous choices, and the processing time required for finding the sought consequences is reduced. However, this information storage mode displays the consequences of the chosen premises at each step and occupies an even greater space in the memory and on the screen and the sheet than in the prior art, and thus does not allow the objectives of compressing the information to be fulfilled.

Figures 3, 4, 6:
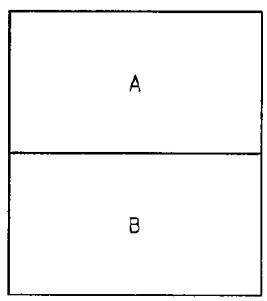
FIG. 3 illustrates a representation in the form of a table of a hierarchical knowledge structure according to one aspect of the invention.
FIGS. 4 and 5 illustrate a document representing a hierarchical knowledge structure by a set of unbound folded sheets, according to one aspect of the invention.
FIG. 6 shows a chart indicating a numbering scheme according to an aspect of the invention.

In order to also solve this objective, FIG. 3 illustrates another representation of a knowledge base according to the invention. In this example, the hierarchical structure of the premises and of their corresponding prescriptions is represented by two tables, an upper table for the premises A, A1, A12, etc. and a lower table for the corresponding consequences B, B1, B12, etc. By analogy with the case of FIG. 2, the central line 300 is a symmetry line; each cell of the upper table contains a premise, and the consequence of this premise (which is also the next prescription) occupies, in the lower table, a symmetrical position. Again, the prescriptions can be individualized.

The table's rows indicate different hierarchical levels, the rows further away from the symmetry line 300 being hierarchically higher than the rows closer to said line. The cells A1 and A2, for example, contain premises that will be processed after the premises of cell A that occupies a higher hierarchical position. The same applies to the consequences B1 and B2 relative to the consequence of cell B.

A decision with the diagram of FIG. 3 is thus taken by starting with the prescription of the highest hierarchical order, in this case prescription B, then by verifying among the different corresponding premises (A1 or A2) which one is the most adapted or corresponds better to the given situation. This premise (for example A1) determines the subsequent consequence (B1 in this example), and so on until the premises and prescriptions of lower hierarchical order close to the line 300.

This mode of organization has the advantage of enabling growth or modifications simply by adding or modifying rows in a rectangular table. It is possible to add or delete rows of premises and of consequences very easily, without necessarily having to update other rows or other links or branches external to the row.

In FIG. 3, the hierarchical position of each premise or of each consequence, and its relation with the other premises or consequences of the table, is implicit and arises only from the position of this premise or consequence in the table, more precisely of the row occupied by this premise/consequence. In contrast with the tree of FIG. 1 or 2, there are no explicit branches or links that determine this hierarchical position. The table can be updated by simply adding, modifying, deleting or permuting rows, without having to modify branches or links.

In the case of a table stored electronically, it is possible to forgo storing and managing a definition of each branch of the table. The particular mode of representation of the invention thus makes it possible to reduce the quantity of electronic memory necessary for storing the tables of premises and of consequences and thus also to increase the processing speed. When displayed on a screen or a sheet, the premises and consequences can be presented very close to one another, since it is not necessary to reserve space for the representation of the branches. This structure thus allows the space necessary for storing and representing the information to be reduced and to forgo the explicit storage and maintenance of a links table.

This computer solution makes it advantageously possible to navigate in the tables of premises and of consequences/prescriptions. Passing to each lower hierarchical level is achieved by selecting, e.g. by means of the mouse, one of the premises from among the alternatives proposed from a prescription. Advantageously, the selected premise and the consequence of this premise (the next prescription) are marked in a particular manner on the screen in order to enable the user to easily locate the place where it is found in the table. It is also possible to display the data individualizing each prescription, either automatically when this consequence/prescription is selected, or through an additional action from the user, for example a click, a right click of the mouse, etc. Furthermore, the path traveled through the structure can be displayed on the screen and/or printed for example in the form of a document summarizing in a compact form the list of selected prescriptions and premises.

In the case of a table stored in a computer program of spreadsheet type, the hierarchical dependence depends on the cell occupied by each premise/consequence in the sheet of the spreadsheet. The spreadsheets are optimized for storing this information in quasi-implicit manner, with memory requirements that are very limited and in any case lower than the requirements for storing the definition of a branch in a tree.

The table of FIG. 3 further occupies a rectangular surface by leaving more width to the hierarchically important premises and consequences for which a complete text is often necessary. This table can be easily generated, edited and/or printed, for example with a spreadsheet-type software, and printed on a rectangular sheet.

On FIG. 3, the hierarchical position of each premise depends on the row occupied. It is however also possible to provide a column structure or a structure occupying several pages or several sheets of a spreadsheet. In one embodiment, each hierarchical level is stored on another sheet. The first sheet thus contains the premise of the highest hierarchical order (A) and the corresponding consequence (B), the second sheet the premises of second order (A1 and A2) with the corresponding consequences (B1 and B2), and so on.

In these different electronic embodiments, an individualization window can for example open close to the prescription to be individualized. This window opens for example when said prescription has been selected by the user, for example with a mouse click, or in the case of automatic selection of the prescription by the program, for example if the program enables navigation from one prescription to a premise and from one premise to a prescription. In an advantageous embodiment, this individualization window opens above the prescription box, i.e. between this square (for example B1) and the line above it with the two next hierarchically lower prescriptions (B11 and B12) or between this square and the axis 300. The individualizing window can also partly cover the next prescriptions that do not need to be legible immediately. The individualizing data can however be displayed at another place, for example on an additional row or table displayed on the page. The individualization window can also represent in graphical form, for example with the aid of a tree, a series of distinctions and sub-distinctions organized hierarchically.

Figure 5:
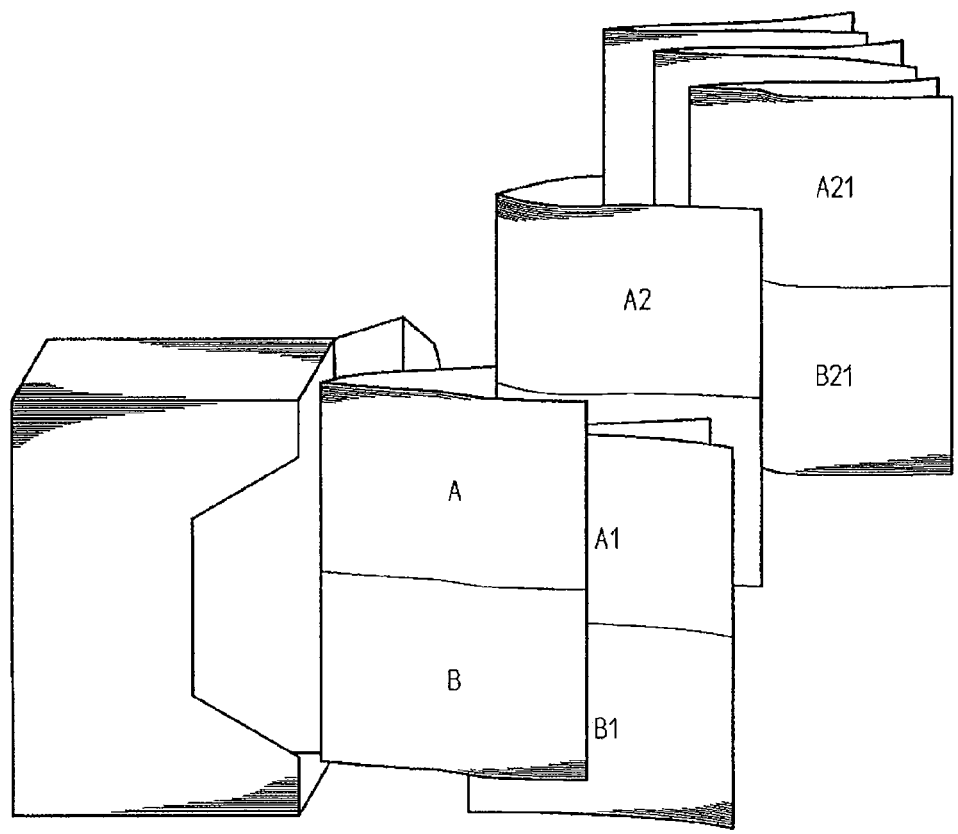

FIGS. 4 and 5 illustrate a variant embodiment of the invention wherein the premises and the corresponding consequences/prescriptions are stored in printed or written form. In this example, the premises and the consequences are printed on folded sheets to form booklets. Preferably the booklet is not bound, in the sense that the folded sheets and group of sheets can be extracted from the book and replaced into the book at leisure. In alternative, the folded sheets may not be permanently bound together, but kept by a suitable detachable bonding system. For example each folded sheet comprises four pages. The first page is separated into areas, the upper area for the premise and one or two lower areas of the same booklet for the corresponding consequences and prescriptions.

The hierarchical relation between the different elements translates in the fact that the folded sheet comprising particular cases is nested in the folded sheets relative to the general case on which it is logically dependent. The numbering of the premises A, A1, A2, A21 and of the consequences B, B1, B2, B21 follow the same pattern in FIG. 6 as in FIGS. 2 and 3. Optionally, each folded can bear a number or other indicia reflecting the order in which the folded sheets should be inserted within one another. The chart in FIG. 6 indicates a possible numbering scheme with cells numbered "A", "non-A", "B" etc., where each cells correspond to a folded sheet, and each folded sheet is nested into his left neighbor, for example. The numbering scheme allows locating each folded sheet in the hierarchical structure.

As in the case of FIG. 3, updating can be achieved simply by adding, replacing or permuting folded sheets.

In this embodiment with non-bound nested sheets, the individualization of each prescription (or consequence) is advantageously on pages 2 and 3 of each folded sheet, i.e. starting at the back of the page on which the prescription to be individualized appears. Alternatively it would be possible to display these individualizing data on the same page as the corresponding prescription, and/or on a leaf associated to this page. Page 4 of each folded sheet may be used for other information, such as references to other works.

Storing the premises, consequences/prescriptions and individualisations in the form of nested folded sheets according to the FIGS. 4 and 5 has the same advantages as storage in the form of a table according to FIG. 3, notably a reduction of the space required for printing and storage, since the hierarchical subordination of the consequences and of the premises depends only on the order of insertion of the folded sheets, without this subordination having to be explicitly printed or stored. Furthermore, updating such a document is technically simple and is achieved by replacing, inserting, discarding or permuting folded sheets, without having to modify the references (branches) on the other sheets not affected by the modification.

The invention is applicable industrially to the production of printed documents in the form of collections of printed leafs and/or of electronic documents. It exhibits different technical advantages, including notably a reduction of the number of necessary pages, respectively of the required memory space, and a reduction of the processing time necessary for discovering the consequences of the previous premises, as well as assigning to every piece of information an unique place in even the most complex tree structure, whereas such a complex structure could not be described in a linear text.

The invention claimed is:

1. A method for utilizing a hierarchical knowledge structure in an information-retrieval system, comprising:
   a) selecting a premise, from a set of premises organized hierarchically in a table of premises, a hierarchical position of the premise being indicated by at least one of a row or a column of the table of premises occupied by the premise;
   b) navigating to a consequence in a table of consequences based on the premise selected, the table of consequences hierarchically organizes a set of consequences, a hierarchical position of the consequence being indicated by a row or a column of the table of consequences occupied by the consequence, the table of consequences and the table of premises being symmetrical such that navigating to the consequence includes navigation to a position, in the table of consequences, corresponding to the hierarchical position of the premise selected in the table of premises;
   c) identifying one or more premises that follow from the consequence, the one or more premises occupying hierarchical positions representing a lower hierarchical level than a hierarchical level associated with the premise selected in a); and
   d) repeating a)-c) by selecting one premise of the one or more premises in c) following from the consequence until a consequence occupying a lowest hierarchical level is identified, wherein the one premise selected corresponds to a situation to which the hierarchical knowledge structure is applied,
   wherein the said table of premises and said table of consequences are stored on a non-transitory computer-readable storage medium of a computer system.

2. The method of claim 1, wherein a hierarchical subordination of the premise and of the consequence arises implicitly from respective positions of the premise and of the consequence in the table of premises and the table of consequences, the table of premises and the table of consequences being devoid of branches.

3. The method of claim 1, comprising a step of displaying, on a display screen of said computer system, individualizing data for individualizing predefined consequences of the table of consequences.

4. The method of claim 3, wherein said individualizing data are visible, on the display screen of said computer system, only when a corresponding consequence of the table of consequences is selected.

5. An information-retrieval device, comprising:
   an electronic memory configured to store a hierarchical knowledge structure that includes a table of premises and a table of consequences symmetrically associated with one another such that respective consequences occupy symmetrical positions in the table of consequences as occupied by corresponding premises in the table of premises;
   a display configured to display the hierarchical knowledge structure; and
   a selection device configured to enable selection of a premise in the table of premises or a consequence in the table of consequences,
   wherein via the selection device, a selection of a premise, from the table of premises, is obtained and the display is further configured to navigate to a corresponding consequence, in the table of consequences, respectively associated with the premise selected,
   wherein after navigation to the corresponding consequence, one or more premises that follow from the corresponding consequence are identified on the display as occupying hierarchical positions representing a lower hierarchical level than a hierarchical level associated with the premise selected via the selection device, and
   wherein selection, via the selection device, of one premises of the one or more premises that follow from the corresponding consequence and subsequent navigation, by the display, to other consequences repeatedly occurs until navigation to a consequence occupying a lowest hierarchical level.

6. The information-retrieval device of claim 5, wherein rows of cells indicate different hierarchical levels of the hierarchical knowledge structure with rows more distant from a dividing line between the table of premises and the table of consequences being hierarchically higher than rows closer to said dividing line, and at least part of cells of a hierarchically lower row being adjacent to cells of a hierarchically higher row on which the cells of a hierarchically lower row logically and directly depend.

7. The device of claim 5, wherein the hierarchical knowledge structure further includes individualizing data for individualizing each consequence of the table of consequences.

* * * * *